(12) United States Patent
Miura et al.

(10) Patent No.: US 6,665,535 B1
(45) Date of Patent: *Dec. 16, 2003

(54) MOBILE COMMUNICATION SYSTEM AND COMMUNICATIONS METHOD THEREIN

(75) Inventors: Yoshihiro Miura, Nagoya (JP); Naoki Osawa, Nagoya (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/564,338

(22) Filed: May 3, 2000

(30) Foreign Application Priority Data

Jul. 2, 1999 (JP) .......................... 11-189692

(51) Int. Cl.[7] ................................. H04Q 7/20
(52) U.S. Cl. ...................... 455/422; 455/456
(58) Field of Search ................... 455/422, 450, 455/455, 433, 435, 62, 440, 456.1, 457

(56) References Cited

U.S. PATENT DOCUMENTS 5,842,131 A * 11/1998 Yamane ...................... 342/452
5,950,137 A * 9/1999 Kim ........................... 455/456

* cited by examiner

*Primary Examiner*—Nay Maung
*Assistant Examiner*—Tu Nguyen
(74) *Attorney, Agent, or Firm*—Katten Muchin Zavis Rosenman

(57) ABSTRACT

Information on the area occupied by a receiving terminal is present is passed to the sending terminal, prior to setup a call, in units of CAs (Cell Areas) that are smaller than LAs (Local Areas). Accordingly, the position occupied by the sending terminal can be specified, so that calls that are unnecessary due to that position do not have to be made, whereupon unnecessary tolls are avoided.

18 Claims, 11 Drawing Sheets

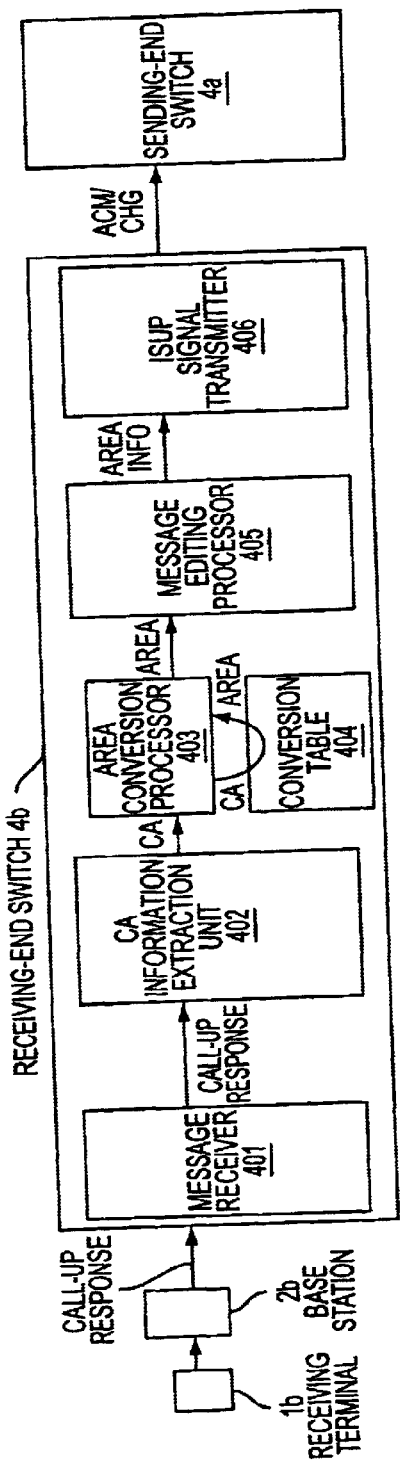
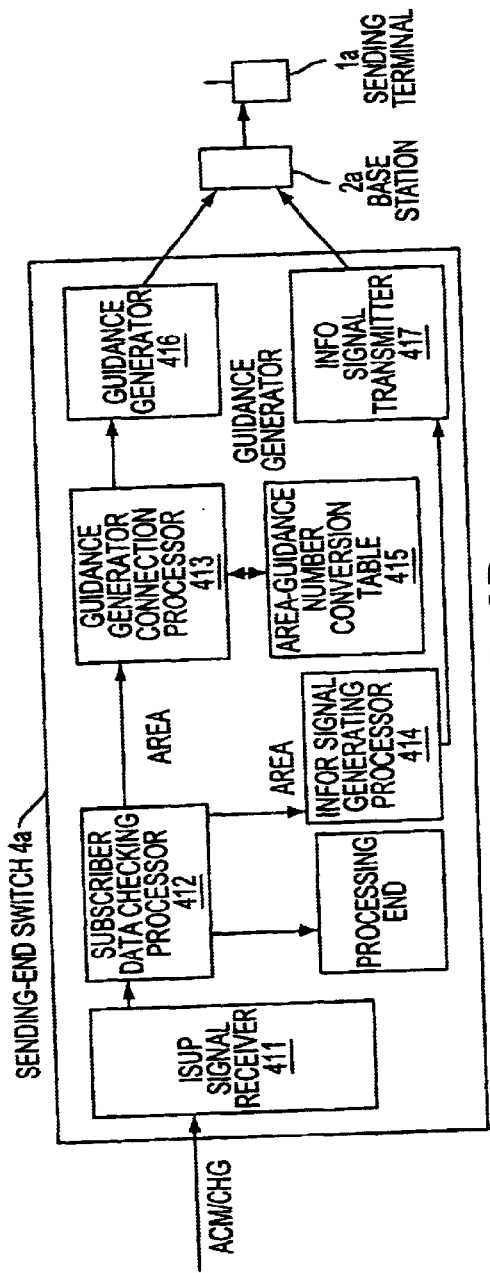

MOBILE COMMUNICATION SYSTEM AND COMMUNICATIONS METHOD THEREIN

BACKGROUND OF THE INVENTION

1. Field of the Invention

This invention relates to a mobile communications system, and communications method therein, for setup communications between terminals where at least the terminals on the receiving end are mobile communications terminals (hereinafter "mobile terminals"), and particularly to a mobile communications system and communications method wherein, when there are communications between mobile terminals, notification of the area occupied by a mobile terminal on the receiving end is made to the terminal on the sending end.

2. Description of the Related Art

FIG. 11 presents an example configuration of a common mobile communications system. In FIG. 11, a situation is presumed wherein a mobile terminal la on the sending end (hereinafter "sending terminal") performs a call-up request to a mobile terminal 1b on the receiving end (hereinafter "receiving terminal"). A call-up request signal from the sending terminal la is routed through a base station 2a controlling the area occupied by the sending terminal 1a, and through a base station controller 3a controlling a plurality of base stations 2a, and arrives at a switch 4a. The area controlled by a base station 2a is called a cell area (CA), while an area comprising a plurality of CAs under the control of a base station controller 3a is called a location area (LA). The switch 4a controls a plurality of base station controllers 3a.

The switch 4a accesses an HLR (home location register), finds the switch 4b that controls the area occupied by the receiving terminal 1b, and sends a call-up request signal to the switch 4b. The HLR is a storage device that stores area information in LA units occupied by mobile terminals. That area information is updated every time any of the mobile terminals move between LAs.

Thus the switch 4a finds the switch 4b controlling the And area occupied by the receiving terminal 1b, and performs processing to establish communications between the sending terminal 1a and the receiving terminal 1b, following a common ISDN protocol.

Conventionally, however, notification of the position occupied by the receiving terminal 1b is not made to the sending terminal 1a prior to setup the call. Hence a sending party using the sending terminal 1a is unable to know beforehand the position of the receiving party using the receiving terminal 1b. That being so, in cases, for example, where the position occupied by the receiving party is not where the sending party assumes it to be, and there is no need to establish a call, a problem arises in that a call is established, and a toll is paid, even in cases where the position of the receiving party is far removed from the position of the sending party, and where there is no need to communicate at such a high cost.

It is also conceivable, on the other hand, that the switch 4a will make notification of the LA of the receiving terminal 1b obtained from the HLR. However, since an LA is a broad area roughly equivalent to a prefecture, that is too broad an area for determining the position occupied by the receiving terminal 1b.

SUMMARY OF THE INVENTION

An object of the present invention, therefore, is to provide a mobile communications system and communications method for notifying a sending terminal, prior to setup a call, of area information capable of specifying the position occupied by the receiving terminal.

In order to achieve the object stated above, one aspect of the present invention is that information on the area occupied by a receiving terminal is passed to the sending terminal, prior to setup a call, in units of CAs that are smaller than the LAs described earlier. Accordingly, the position occupied by the sending terminal can be specified, so that calls that are unnecessary due to that position do not have to be made, whereupon unnecessary tolls are avoided.

In order to achieve the object stated above, another aspect of the present invention is a mobile communications system comprising: a first switch; a first terminal accommodated in the first switch; a second switch; a plurality of base stations accommodated in the second switch; and a second terminal that is a mobile terminal present inside (occupying) an area controlled by one base station of the plurality of base stations, wherein the second switch acquires information on the area occupied by the second terminal, from a response of the second terminal to a call based on a call establishment request to the second terminal from the first terminal, and sends the area information to the first switch; and the first switch passes the area information to the first terminal during call setup processing.

In the invention described above, the first switch determines whether or not the first terminal has display functions. When the first terminal does have display functions, the first switch passes signals for displaying the area information to the first terminal, and when the first terminal does not have display functions, the first switch may pass signals for audio-outputting the area information to the first terminal.

In the invention described above, moreover, in a preferable mode thereof, the second switch puts the call setup processing on standby for a prescribed time period following the sending of the area information.

At this time, for example, the first switch will send a call release instruction to the second switch when a call disconnect request is received from the first terminal. The second switch will restart call setup processing when no call release instruction is received within the prescribed time period, and will execute call release processing when a call release instruction is received.

Alternatively, for example, the first switch will send a call setup processing continuation instruction to the second switch when a call setting processing continuation request is received from the first terminal. The second switch will restart call setup processing when a call setup processing continuation instruction is received from the first switch within the prescribed time period, and will execute call release processing when no call setup processing continuation instruction is received.

In the invention described above, furthermore, in another preferable mode thereof, the second switch places call setup processing on standby until a call setup processing continuation instruction is received from the first switch after sending the area information.

At this time, for example, the first switch will send a call setup processing continuation instruction to the second switch when no call disconnect request is received from the first terminal, and will send a call release instruction to the second switch when a call disconnect request is received. The second switch will restart call setup processing when a call setup processing continuation instruction has been received from the first switch, and will execute call release processing when a call release instruction has been received from the first switch.

Alternatively, for example, the first switch will send a call setup processing continuation instruction to the second switch when a call setup processing continuation request has been received from the first terminal, and will send a call release instruction to the second switch when no call setup processing continuation request has been received. The second switch will restart call setup processing when a call setup processing continuation instruction has been received from the first switch, and will execute call release processing when a call release instruction has been received from the first switch.

Furthermore, in order to achieve the object stated above, yet another aspect of the present invention is a method for communicating between a first terminal accommodated in a first switch and a second terminal that is a mobile terminal present inside (occupying) an area controlled by one of a plurality of base stations accommodated in a second switch, comprising the steps of: acquiring information on the area occupied by the second terminal from the response of the second terminal to a call from the second switch based on a call setup request to the second terminal from the first terminal; sending the area information from the second switch to the first switch; and passing the area information from the first switch to the first terminal during call setup processing.

BRIEF DESCRIPTION OF THE DRAWINGS

FIGS. 2A and 2B are diagrams of example configurations of switches configuring a mobile communications system in an embodiment aspect of the present invention;

DESCRIPTION OF THE PREFERRED EMBODIMENTS

Embodiment aspects of the present invention are now described. The technical scope of the present invention, however, is not limited to these embodiment aspects.

Figure 1A:
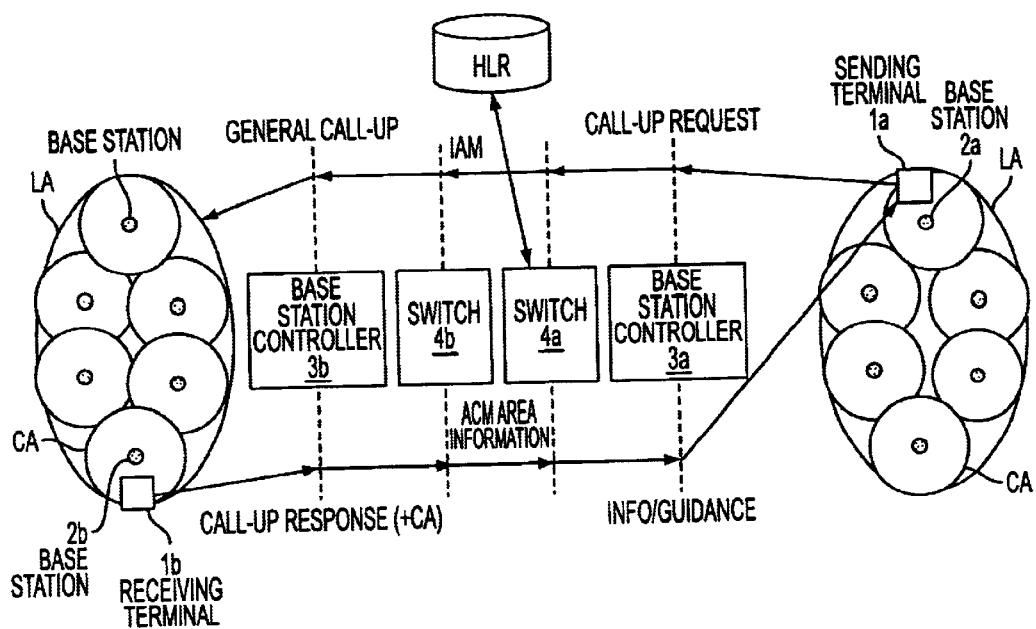
FIGS. 1A, 1B and 1C are diagrams for explaining the theory of the present invention.
Figure 1B:
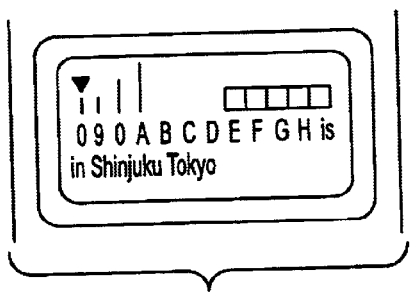
Figure 1C:

FIGS. 1A, 1B, and 1C are diagrams for explaining the theory of the present invention. FIG. 1A illustrates an example case where a sending terminal 1a performs a call-up request to a receiving terminal 1b. The call-up request, routed through a base station 2a that controls the position occupied by the terminal a and through a base station controller 3a that controls a plurality of base stations including the base station 2a, is sent to a receiving-end switch 4a that accommodates that base station controller 3a. The switch 4a, following signal procedures established by ISUP (ISDN User Part), sends an IAM signal to the receiving-end switch 4b accommodating the base station controller 3b that controls the position occupied by the receiving terminal 1b. The switch 4b, upon receiving the IAM signal, makes a general call-up request to the base station controller 3b. The base station controller 3b sends a general call-up signal to all of the base stations in the area (LA=location area) controlled thereby. Then each of the base stations sends that general call-up signal to the area (CA=cell area) controlled thereby.

Now, when the receiving terminal 1b occupies the cell area CA controlled by base station 2b, if the receiving terminal 1b receives a general call-up request and sends out a call-up response signal therefor, the call-up response signal from the base station 2b is sent via the base station controller 3b to the switch 4b. This call-up response signal contains identification information for the cell area CA controlled by the base station 2b. The switch 4b, following the signal procedure established by ISUP, sends out both an ACM signal and an area information signal containing area information corresponding to the CA identification information for the base station 2b to the switch 4a. The switch 4a, upon receipt of that area information signal, generates either an info signal for displaying the area information for the receiving terminal 1b on the display screen of the sending terminal 1a or a guidance signal for outputting audio, and sends it via the base station controller 3a and the base station 2a to the sending terminal 1a.

When the sending terminal 1a receives the info signal noted above, area information for the receiving terminal 1b is displayed on the screen of the sending terminal 1a as diagrammed in FIG. 1B. Or, when it receives the guidance signal noted above, area information from the sending terminal 1a is audio-output, as diagrammed in FIG. 1C. Based on that information, the sending party having the sending terminal 1a can choose whether or not to continue processing for connecting to the receiving terminal 1b.

FIGS. 2A, and 2B are diagrams of example configurations of switches configuring a mobile communications system in an embodiment aspect of the present invention. FIG. 2A is a diagram of an example configuration of the receiving-end switch 4b, and FIG. 2B is a diagram of an example configuration of the sending-end switch 4a. In FIG. 2A, the receiving-end switch 4b receives a call-up response signal from the receiving terminal 1b with a message receiver 401. Then a CA information extraction unit 402 extracts the CA identification information from the call-up response signal. An area conversion processor 403 references a conversion table 404 and converts the extracted CA identification information to area information. The conversion table 404 is a table containing area information corresponding to the CA identification information for the plurality of base stations controlled by the base station controller.

Figure 3:
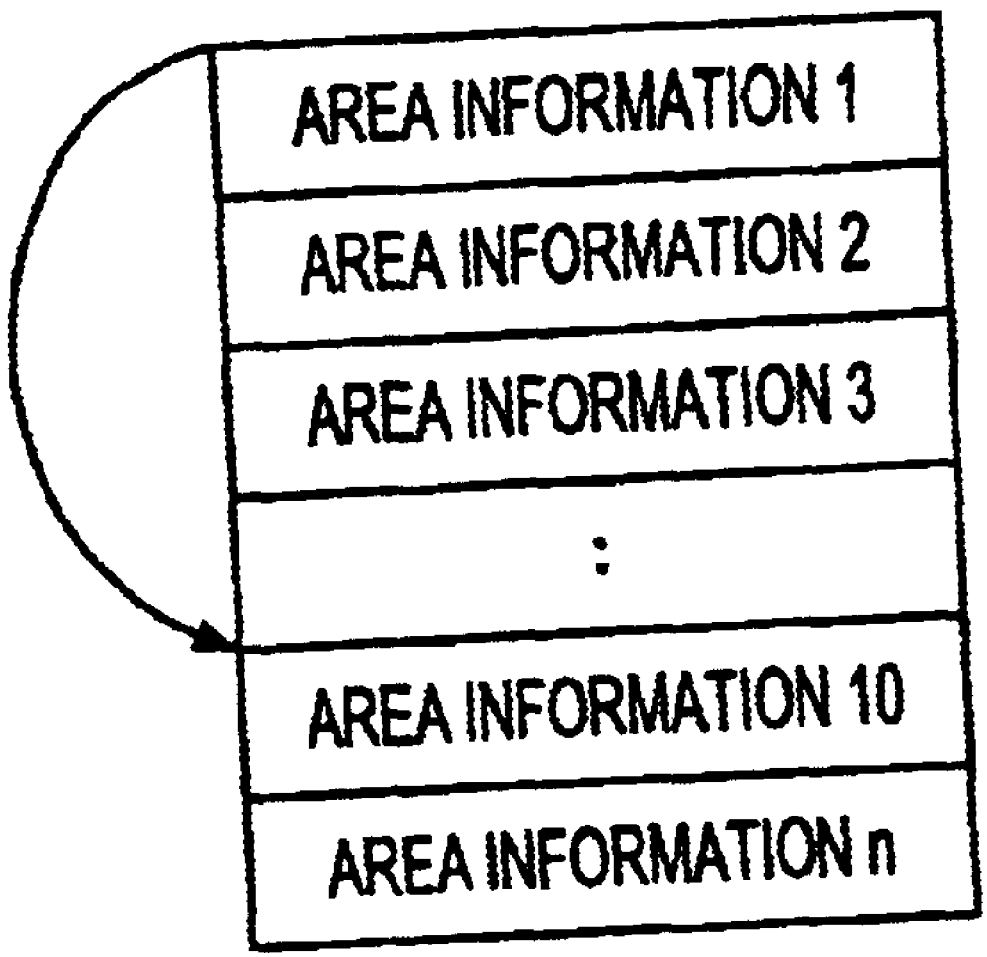
FIG. 3 is a diagram of an example of a conversion table.

FIG. 3 is a diagram of an example conversion table. In FIG. 3, the conversion table contains area information indexed to CA identification information. For example, in a case where the CA identification information is given by a number, and the CA identification information extracted is CA=10, the 10th area information from the top is selected, for example.

A message editing processor 405 edits ISUP-signal messages based on the call-up response signal. In this embodiment aspect of the present invention, the area information is contained in a CHG signal in the ISUP signal. The CHG signal is a message introduced for the purpose of implementing a so-called standard inter-vendor settlement scheme. A standard inter-vendor settlement scheme is a scheme that standardizes interconnections between different vendors, for the purpose of coping with the complexities of mobile-unit communications involving interconnections between a plurality of vendors, by making mutual notifications of vendor information, toll area information, and toll information when the vendor differs between the sending-end switch and the receiving-end switch. The edited ISUP signal (CHG signal containing area information and ACM signal) is sent from an ISUP signal transmitter 406. is In FIG. 2B, the ISUP signal sent from the ISUP signal transmitter 406 in the receiving-end switch 4b is received by an ISUP signal receiver 411 in the sending-end switch 4a. The ISUP signal receiver 411, following the ISUP protocol, analyzes the ISUP signal. A subscriber data checking processor 412 examines the subscription conditions of the sending terminal 1a subscriber for the service provided by the communications vendor. This checking processor 412 acquires those subscriber conditions from subscriber data in the HLR (home location register; cf. FIG. 1) commonly owned by the mobile communications networks. If the sending terminal 1a subscriber is not subscribed to a service (receiving terminal area information notification service) that implements the receiving terminal area information notification method of the present invention, the subscriber data checking processor 412 terminates processing of this service. If the sending terminal 1a subscriber is subscribed to this service but the sending terminal 1a does not have area information display functions, the subscriber data checking processor 412 passes the area information to a guidance generator connection processor 413. If the sending terminal 1a has area information display functions, the subscriber data checking processor 412 passes the area information to an info signal generating processor 414.

The guidance generator connection processor 413 extracts a guidance control number corresponding to the area information passed to it, from an area information/guidance control number conversion table 415, and passes that to a guidance generator 416. The area information/guidance control number conversion table 415 is a table containing guidance (signals for audio output) control numbers corresponding to area information. The guidance generator 416, which contains pre-loaded guidance data corresponding to the control numbers, sends guidance corresponding to notified control numbers to the sending terminal 1a via the base station controller 3a and base station 2a. When that is done, as diagrammed in FIG. 1C, the area information for the receiving terminal 1b is audio-output.

The info signal generating processor 414, meanwhile, generates information (info signals) needed to display area information on the display screen of the sending terminal 1a. The generated info signals are sent from an info signal transmitter 417 via the base station controller 3a and base station 2a to the sending terminal 1a. When that is done, as diagrammed in FIG. 1B, area information for the receiving terminal 1b is displayed on the display screen of the sending terminal 1a.

Thus, when the area information for the receiving terminal 1b is passed to the sending terminal 1a, in the embodiment aspect of the present invention, time is provided for choosing whether or not to continue call setup processing between the sending terminal 1a and receiving terminal 1b. When continue-processing is instructed by the subscriber within that time, or when nothing is instructed, the sending terminal 1a continues call setup processing. When a disconnect instruction is received within that time from the subscriber, the sending terminal 1a suspends call setup processing.

Hence the sending terminal 1a subscriber can obtain area information on where the receiving terminal 1b is before setup a call with the receiving terminal 1b, and can choose, based on that area information, whether or not to establish the call with that receiving terminal 1b.

Figure 4:
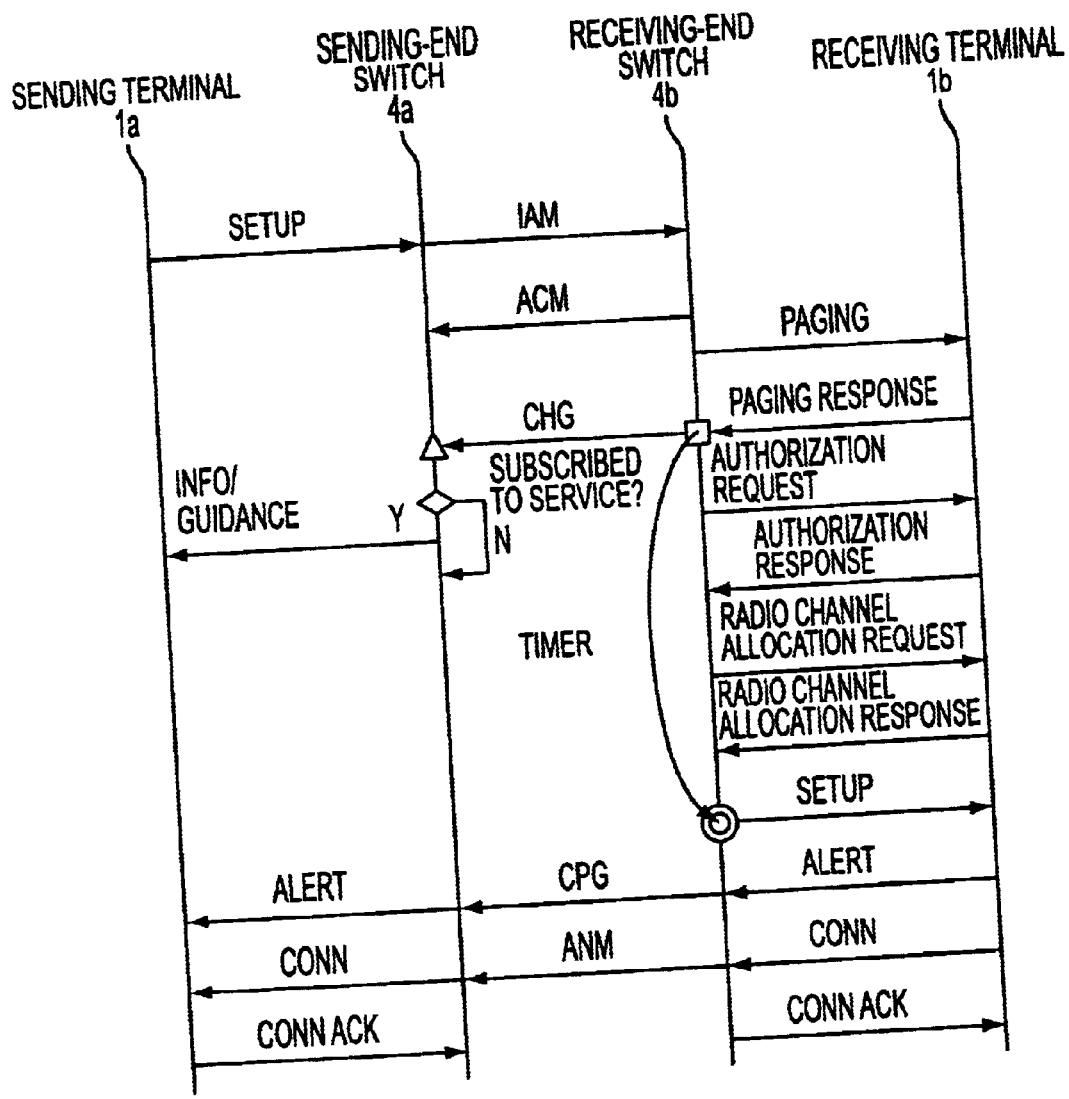
FIG. 4 is a sequence diagram for a call establishment processing method when continuing call setup processing in a first embodiment aspect of the present invention.
Figure 5:
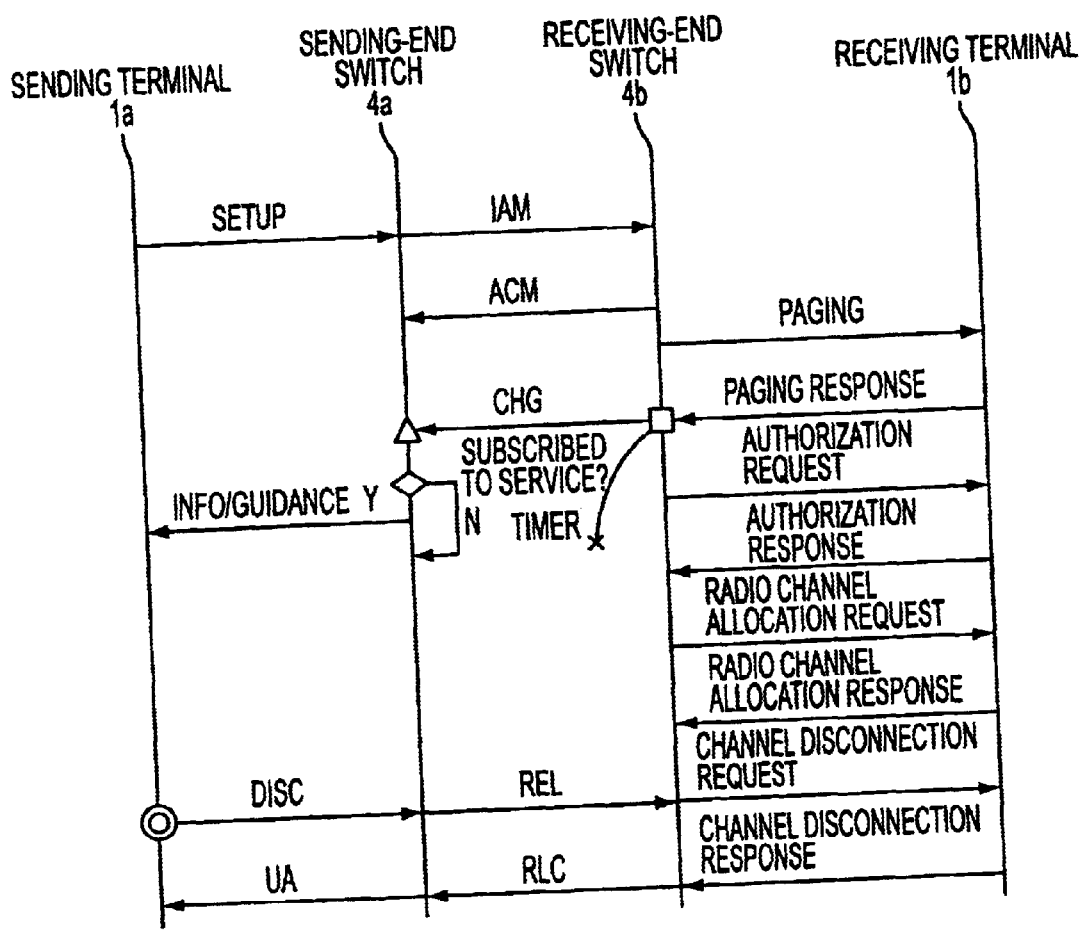
FIG. 5 is a sequence diagram for a call establishment processing method when suspending call setup processing in the first embodiment aspect of the present invention.

A concrete description is now given of call setup processing methods in embodiment aspects of the present invention. FIG. 4 and FIG. 5 are sequence diagrams of a call setup processing method in a first embodiment aspect of the present invention. FIG. 4 is a sequence diagram for a case where call setup processing is to be continued. FIG. 5 is a sequence diagram for a case where call setup processing is to be suspended. In the following sequence diagrams, the base stations and base station controllers between the terminals and the switches are omitted, but the signal exchanges between the terminals and the switches are conducted via these entities as described earlier.

In FIG. 4, when the sending terminal 1a sends a call setup request (SETUP) signal to the switch 4a, the switch 4a sends an address (IAM=initial address message) signal to the switch 4b. The switch 4b, upon receipt of the IAM signal, sends an address complete (ACM=address complete) signal to the switch 4a, and simultaneously sends a general call-up (paging) signal. The receiving terminal 1b, upon receiving that paging signal, sends a general call-up (paging) response signal to the switch 4b. When that is done, a base station (not shown) that relays that paging response signal from the receiving terminal 1b adds its own CA (cell area) identification information to that paging response signal.

The switch 4b, upon receipt of the paging response signal, sends a CHG signal containing area information to the switch 4a, as diagrammed in FIG. 2A. The switch 4a that receives that CHG signal, as diagrammed in FIG. 2B, performs subscriber data checking processing, and sends a guidance signal or information signal to the sending terminal 1a in accordance with the subscriber conditions. The switch 4b, upon receiving the CHG signal, activates an internal timer. When a time set in this timer elapses, the setup processing is continued, but when a release instruction (REL=release) signal is received within the set time, call setup processing is suspended.

The switch 4b, after the timer has been activated, executes the authorization and verification processing and radio channel allocation processing that are ordinary call setup procedures. That is, the switch 4b sends an authorization request signal to the receiving terminal 1b, and the receiving terminal 1b sends an authorization response signal in response thereto to the switch 4b. The switch 4b also sends a radio channel allocation request signal to the receiving terminal 1b, and the receiving terminal 1b sends a radio channel allocation response signal in response thereto to the switch 4b.

The switch 4b does not immediately send the call setup (SETUP) signal upon completion of the authorization and verification processing and radio channel allocation processing, but waits for the time set in the timer to elapse and then sends the call setup (SETUP) signal to the receiving terminal 1b. The receiving terminal 1b that receives the SETUP signal outputs a call-up tone, and sends a calling-up (ALERT) signal to the switch 4b. The switch 4b, upon receiving the ALERT signal, sends a call-in-progress (CPG= call progress) signal to the switch 4a, and the switch 4a sends an ALERT signal to the sending terminal 1a. The switch 4b, upon receiving a response (CONN=connect) signal from the receiving terminal 1b, sends a response (ANM) signal to the switch 4a and also sends a response acknowledged (CONN ACK=connect acknowledgement) signal to the receiving terminal 1b. The switch 4a, upon receiving the response (ANM=answer message) signal, sends a response (CONN) signal to the sending terminal 1a. Upon receipt thereof, the sending terminal 1a sends a response acknowledged (CONN ACK) signal to the switch 4a. Thus one series of call setup processes is completed, and a call-established state ensues between the sending terminal 1a and the receiving terminal 1b.

FIG. 5 is explained next. In FIG. 5, the procedures up to and including the authorization and verification processing and radio channel allocation processing following timer activation by the switch 4b are the same as in FIG. 4, and hence are not further described here. When the sending terminal 1a subscriber has obtained area information for the receiving terminal 1b and judged it unnecessary to continue call setup processing, a disconnect request (DISC= disconnect) signal is sent from the sending terminal 1a to the switch 4a during the time set in the timer. The switch 4a also sends a release instruction (REL=release) signal to the switch 4b. The switch 4b, upon receiving the REL signal, performs processing to release the channel established by the radio channel allocation processing noted earlier. That is, the switch 4b sends a channel disconnect request signal to the receiving terminal 1b, and the receiving terminal 1b sends a channel disconnect response signal in response thereto to the switch 4b. The switch 4b, upon receipt of the channel disconnect response signal, sends a release complete (RLC=release complete) signal to the switch 4a. Then, upon receipt thereof, the switch 4a sends a UA signal to the sending terminal 1a. Thus call setup processing is suspended, and no call is established between the sending terminal 1a and the receiving terminal 1b.

Figure 6:
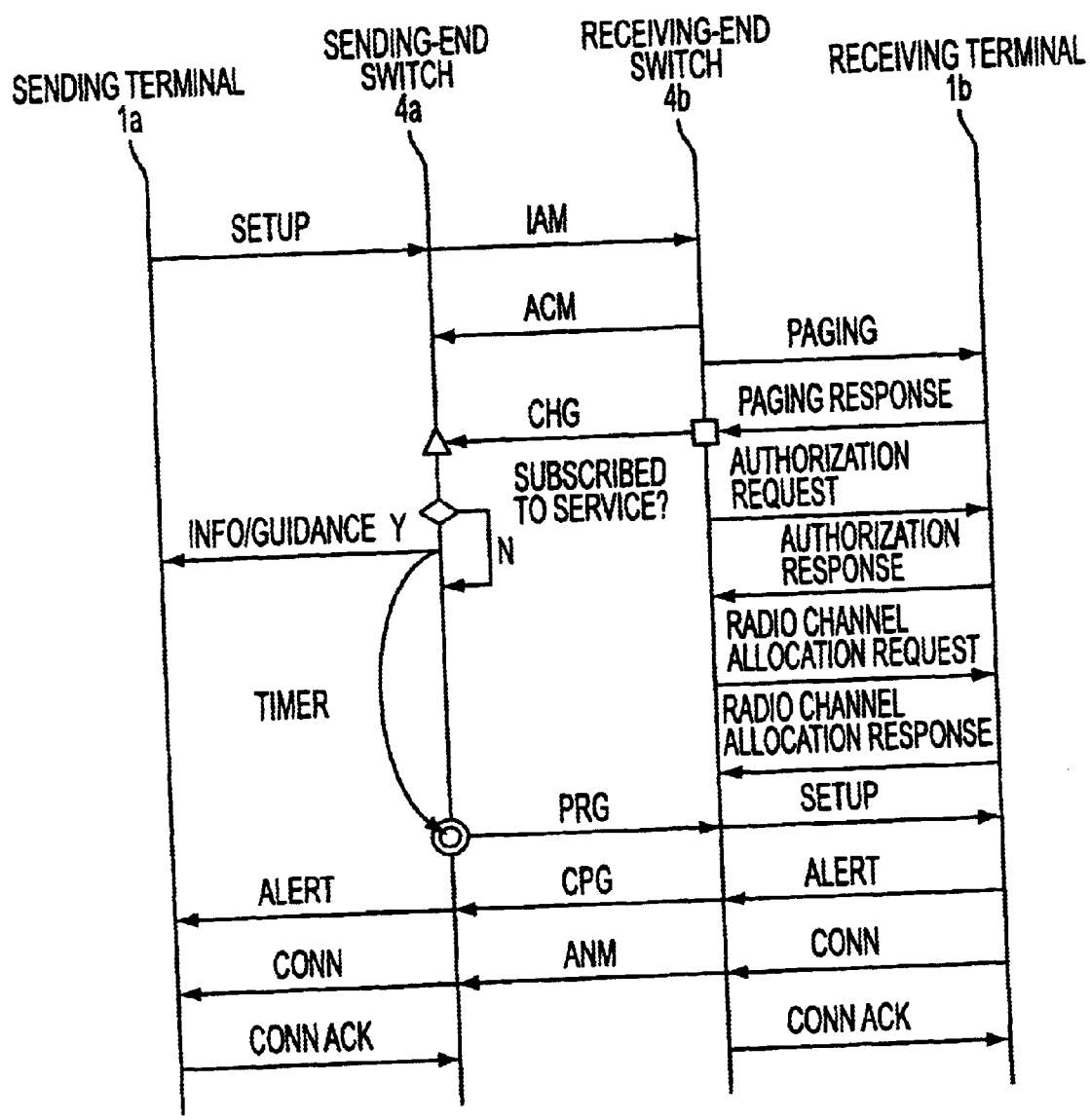
FIG. 6 is a sequence diagram for a call establishment processing method when continuing call setup processing in a second embodiment aspect of the present invention.
Figure 7:
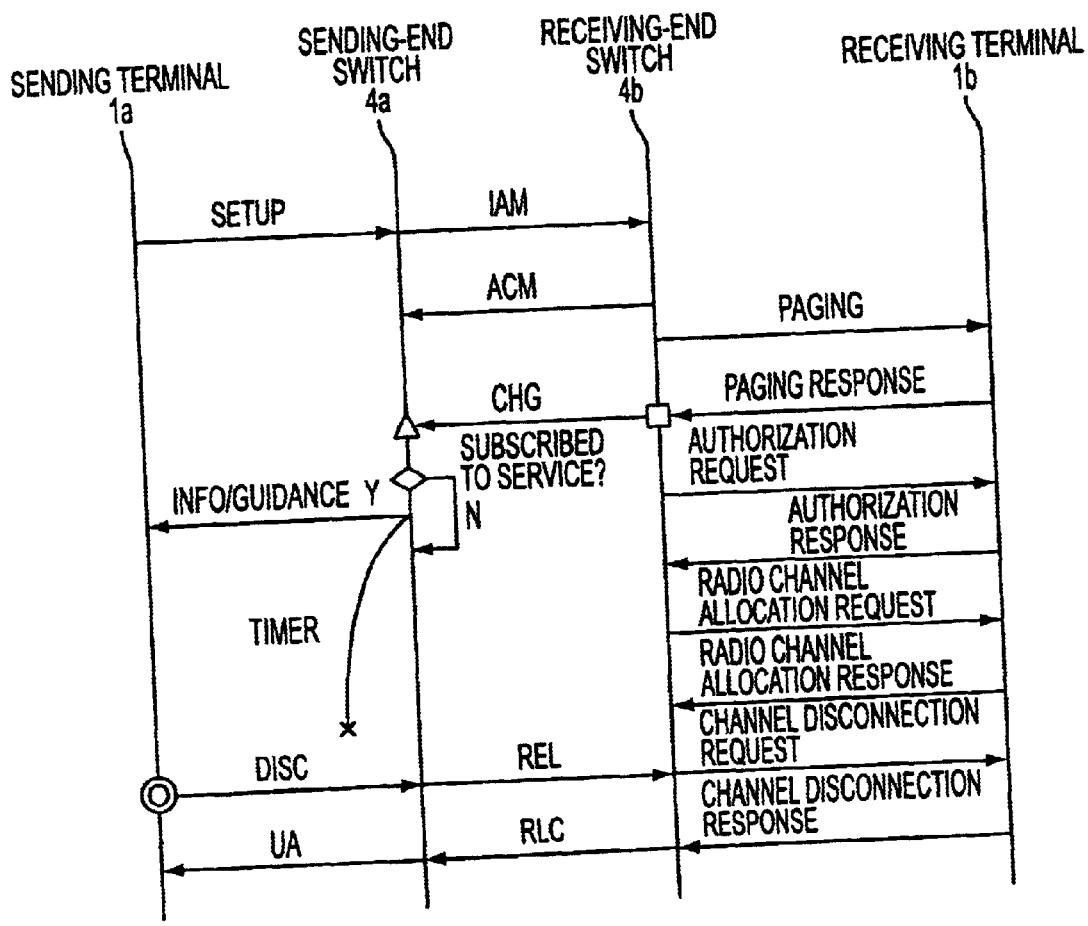
FIG. 7 is a sequence diagram for a call establishment processing method when suspending call setup processing in the second embodiment aspect of the present invention.

FIG. 6 and FIG. 7 are sequence diagrams of call setup processing in a second embodiment aspect in the present invention. FIG. 6 is a sequence diagram for a case where call setup processing is continued, and FIG. 7 is a sequence diagram for a case where call setup processing is suspended. In FIGS. 6 and 7, unlike in FIGS. 4 and 5, a timer is activated in the switch 4a. More specifically, in FIGS. 6 and 7, the call setup procedures up until the switch 4b sends a CHG signal containing area information to the switch 4a are the same as in FIGS. 4 and 5, respectively, and so are not further described here. In FIG. 5 and FIG. 7, the switch 4a, upon receiving the CHG signal from the switch 4b, sends either an info signal or guidance signal, according to the subscriber conditions, to the sending terminal 1a, and also starts an internal timer. This timer terminates, as does the timer in FIGS. 4 and 5, when the prescribed time set has elapsed or when a disconnect request (DISC) signal is received during the set time.

In the case where call setup processing is to be continued, in FIG. 6, the switch 4a, when no disconnect request (DISC) signal has been received within the set time, waits until the time set in the timer has elapsed, and then sends a call setup processing continuation instruction (PRG) to the switch 4b. The switch 4b, having received that PRG signal, sends a call setup (SETUP) signal to the receiving terminal 1b. The call setup procedures following thereupon are the same as in FIG. 4, and so are not further described here.

When call setup processing is to be suspended, in FIG. 7, a disconnect request (DISC) signal is sent from the sending terminal 1a within the time set in the timer. The call establishment suspension procedures thereafter are the same as in FIG. 5, so are not further described here. Furthermore, although not shown in the diagrams, a PRG signal is also sent from the switch 4a to the switch 4b in cases where neither an info signal nor a guidance signal is sent.

Figure 8:
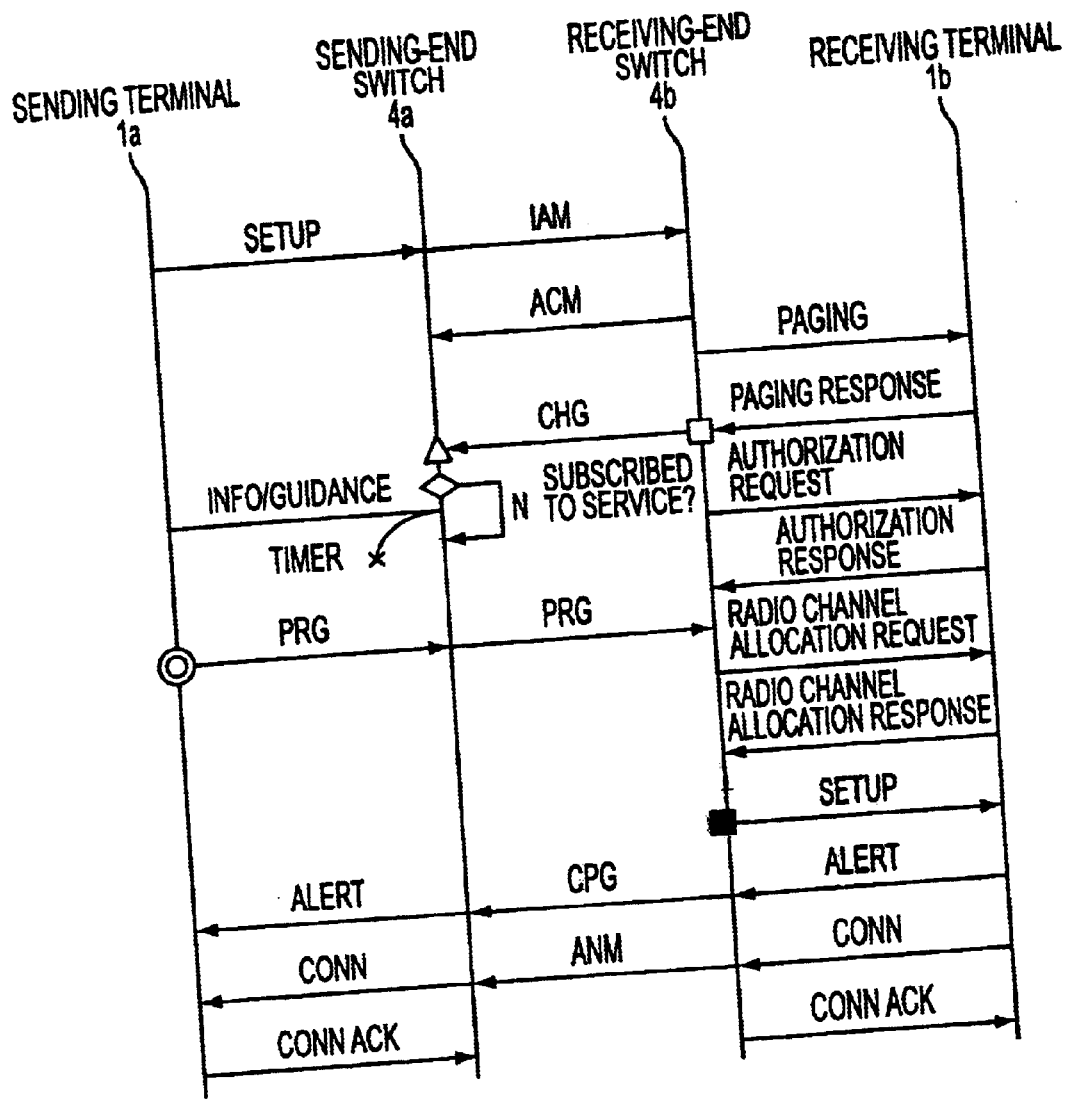
FIG. 8 is a sequence diagram for a call establishment processing method when continuing call setup processing in a third embodiment aspect of the present invention.
Figure 9:
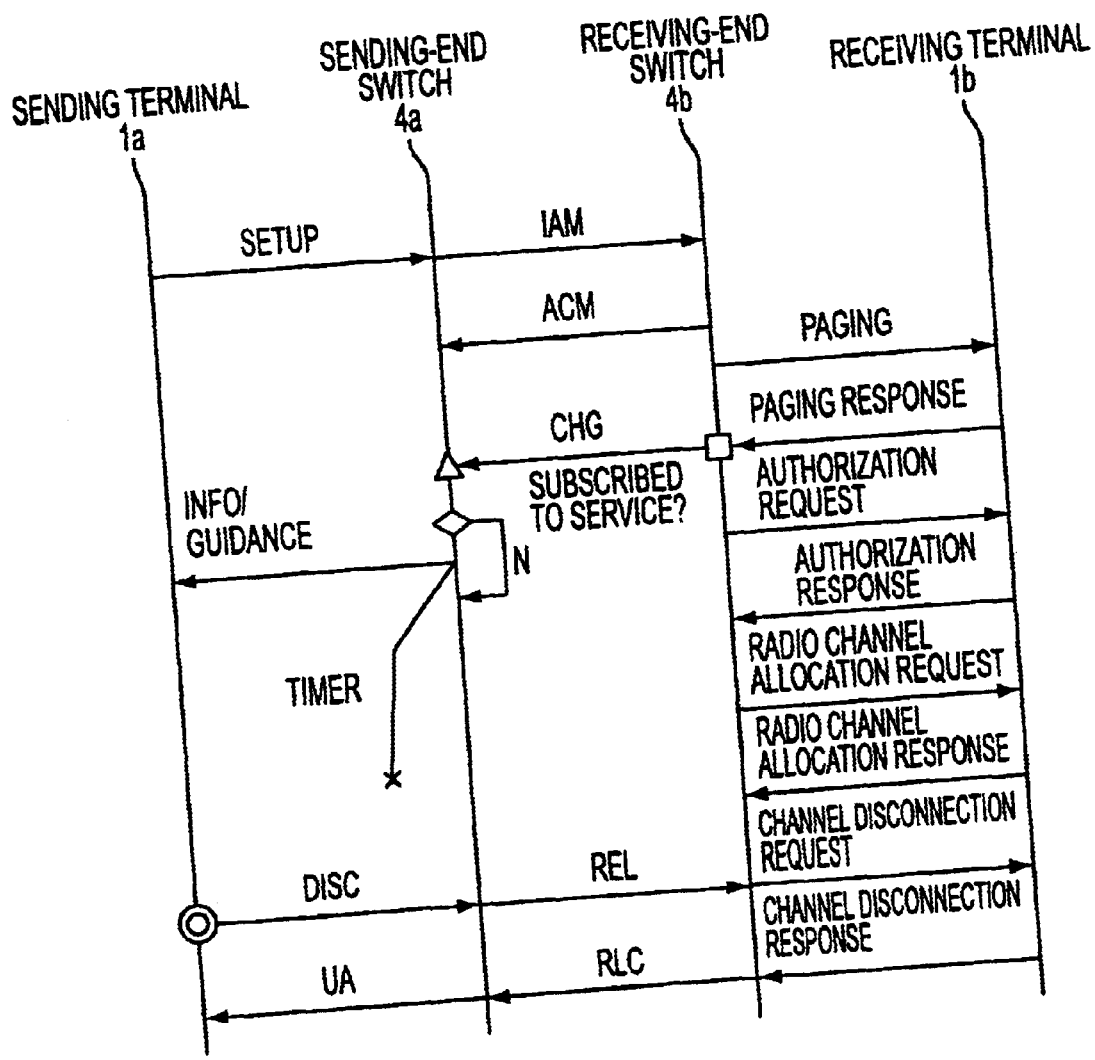
FIG. 9 is a sequence diagram for a call establishment processing method when suspending call setup processing in the third embodiment aspect of the present invention.

FIG. 8 and FIG. 9 are sequence diagrams for call setup processing in a third embodiment aspect of the present invention. FIG. 8 is a sequence diagram for the case where call setup processing is to be continued and FIG. 9 is a sequence diagram for the case where call setup processing is to be suspended. In this embodiment aspect of the present invention, in FIG. 6 and FIG. 7, the timer in the switch 4a is activated. In this embodiment aspect of the present invention, moreover, which is unlike the first and second embodiment aspects described earlier, call setup processing is suspended when the time set in the timer has elapsed, and call setup processing is continued when a call setup processing continuation request (PRG) signal has been received within the set time.

Accordingly, in FIG. 8, during the time set in the timer, the switch 4a, upon receipt of the call setup processing continuation request (PRG) signal from the sending terminal 1a, sends a call setup processing continuation instruction (PRG) to the switch 4b also. The switch 4b, upon receiving the call setup processing continuation instruction (PRG), sends a SETUP signal to the receiving terminal 1b as soon as the authorization and verification processing and radio channel allocation processing described earlier have been completed. Subsequent call setup processing procedures are the same as in FIG. 4, and so are not further described here.

In FIG. 9, moreover, when the time set in the timer in the switch 4a has elapsed without a call setup processing continuation request (PRG) being received, the switch 4a sends a release instruction (REL) to the switch 4b. The call establishment suspension procedures thereafter are the same as in FIG. 5 and so are not further described here.

In FIG. 4 and FIG. 6, furthermore, it is permissible to begin call setup processing by a call setup processing continuation request (PRG) from the sending terminal 1a without waiting for the time set in the timer to elapse. In FIG. 9, alternatively, when call setup processing is to be suspended, it is permissible to suspend call setup processing by a disconnect request (DISC) signal from the sending terminal 1a without waiting for the time set in the timer to elapse.

In FIG. 4 and FIG. 6, moreover, even in cases where the sending terminal 1a is not subscribed to the receiving terminal area information notification service, call setup processing will be temporarily suspended until the time set in the timer in either the switch 4b (FIG. 4) or 4a (FIG. 6) has elapsed, wherefore much time is required to complete the call setup processing. Accordingly, in the case of a sending terminal 1a not being subscribed to this notification service, it is permissible that the switch 4a, upon receipt of a CHG signal, send a call setup processing continuation instruction (PRG) to the switch 4b. In that way call setup processing will continue without waiting for the time set in the timer to elapse.

Figure 10:
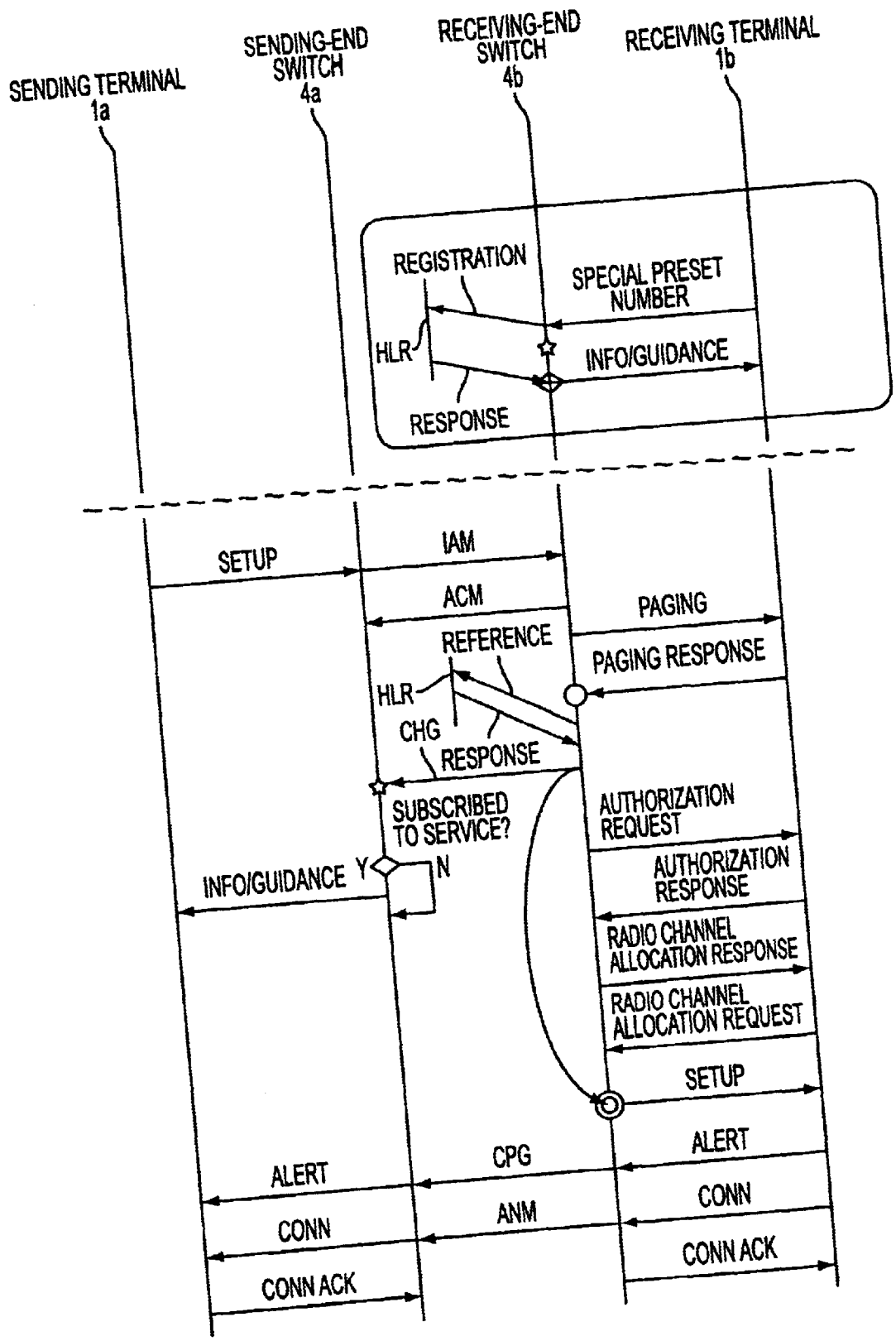
FIG. 10 is a sequence diagram for a call establishment processing method in a fourth embodiment aspect of the present invention.
Figure 11:
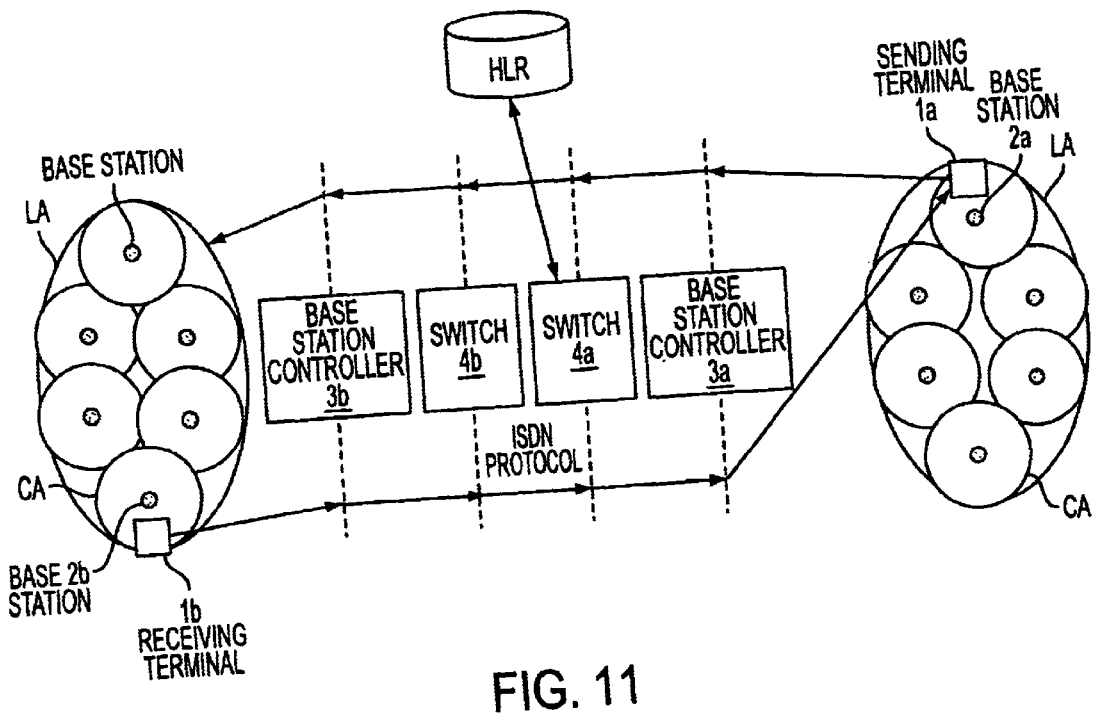
FIG. 11 is a configuration diagram of a common mobile communications system.

FIG. 10 is a sequence diagram for a call setup processing method in a fourth embodiment aspect of the present invention. In this embodiment aspect of the present invention, a function is added which enables the receiving terminal 1b to refuse to pass its own area information to the sending terminal 1a. In FIG. 10, the receiving terminal 1b sends a special preset number for registering the refusal function to the switch 4b. When that is done, the switch 4b performs an area information notification disabling registration for the receiving terminal 1b in the HLR (home location register). The HLR, when that registration is completed, sends a response signal to the switch 4b. The switch 4b then sends a registration verification message as an info signal or guidance signal to the receiving terminal 1b. Receiving terminals 1b that have not been area-information-notification-disable-registered in the HLR are treated as area information notification permitted terminals. Alternatively, the area information notification permission may be registered to the HLR. In those cases, non-registered receiving terminals 1b are treated as area information notification disabled terminals.

As in FIG. 4, moreover, when the sending terminal 1a sends a call setup request (SETUP) signal to the switch 4a, the switch 4a sends an address (IAM=initial address message) signal to the switch 4b. The switch 4b, upon receiving the IAM signal, sends an address complete (ACM=address complete) signal to the switch 4a and, at the same time, sends a general call-up (paging) signal. The receiving terminal 1b, upon receiving that paging signal, sends a general call-up (paging) response signal to the switch 4b. The switch 4b, upon receiving the paging response signal, accesses the HLR and references the registration respecting area information notification disablement or permission. The switch 4b, when the receiving terminal 1b is an area information notification disabled terminal, sends CHG signal wherein the notification disablement information is added to the area information. The switch 4a, when notification disabling information is included in the received CHG signal, sends a notification disabled message as an info signal or guidance signal to the sending terminal 1a. Call setup processing thereafter is the same as in FIG. 4 and so is not further described here.

The registration pertaining to area information notification disablement or permission may be effected at the time of subscribing to the communications services of the communications vendor. Alternatively, the configuration may be made so that the registration content can be changed at any time, so that registration may be established or released by transmitting a special number as described earlier.

In the embodiment aspects described in the foregoing, the sending terminal 1a need not be a mobile terminal; it may instead be a stationary terminal. Also, the signal used in sending area information from the switch 4b to the switch 4a is not limited to a CHG signal, but may be some other signal (such as an ACM signal, for example), or, alternatively, a signal dedicated to sending area information may be newly established.

As based on the present invention, a sending terminal can ascertain the position occupied by a receiving terminal in CA (cell area) units. Accordingly, calls need not be established in cases where, because of the position occupied by the receiving terminal, they are unnecessary, wherefore unnecessary tolls are avoided.

The scope wherein the present invention is protected is not limited to the embodiment aspects described in the foregoing, but extends to the inventions described in the claims and their equivalents.

What is claimed is:

1. A mobile communications system comprising:
   a first switch;
   a first terminal accommodated in the first switch;
   a second switch;
   a plurality of base station controllers accommodated in the second switch;
   a plurality of base stations accommodated in one of the plurality of base station controllers;
   a second terminal that is a mobile terminal present inside a cell area controlled by one of the plurality of base stations, each of the plurality of base station controllers controlling a local area constituted by a plurality of cell areas of base stations, each of the plurality of cell areas being narrower than the local area; and
   a storage device for storing local area information occupied in the second terminal in the local area units, the first and second switch being able to acquire the local area information of the second terminal in the local area units by referencing the storage device;
   wherein the second switch acquires cell area information on the area occupied by the second terminal in the cell area units, from a response of the second terminal to a call based on a call establishment request to the second terminal from the first terminal, and sends the cell area information to the first switch, and the first switch passes the cell area information to the first terminal during call setup processing.

2. The mobile communications system according to claim 1, wherein the second switch puts the call setup processing on standby for a prescribed time period following the sending of the area information.

3. The mobile communications system according to claim 1, wherein the second switch puts call setup processing on standby until a call setup processing continuation instrution is received from the first switch after sending the area information.

4. The mobile communications system according to claim 1, wherein the first terminal is a mobile terminal present inside an area controlled by one base station of the plurality of base stations accommodated in the first switch.

5. A method for communicating between a first terminal accommodated in a first switch and a second terminal that is a mobile terminal present inside one of a plurality of cell areas constituting a local area controlled by one of a plurality of base stations accommodated in a second switch, comprising the steps of:
   acquiring information on the cell area occupied by the second terminal from the response of the second terminal to a call from the second switch based on a call setup request to the second terminal from the first terminal;
   sending the cell area information from the second switch to the first switch; and
   passing the cell area information from the first switch to the first terminal during call setup processing.

6. The method for communicating according to claim 5, wherein the second switch puts the call setup processing on standby for a prescribed time period following the sending of the area information.

7. The method for communicating according to claim 5, wherein the second switch puts call setup processing on standby until a call setup processing continuation instruction is received from the first switch after sending the area information.

8. The method for communicating according claim 5, wherein the first terminal is a mobile terminal present inside an area controlled by one base station of the plurality of base stations accommodated in the first switch.

9. A mobile communications system comprising:
a first switch;
a first terminal accommodated in the first switch;
a second switch;
a plurality of base stations accommodated in the second switch; and
a second terminal that is a mobile terminal present inside an area controlled by one base station of the plurality of base stations;
wherein the second switch acquires information on the area occupied by the second terminal, from a response of the second terminal to a call based on a call establishment request to the second terminal from the first terminal, and sends the area information to the first switch, and the first switch passes the area information to the first terminal during call setup processing;
and wherein the first switch determines whether or not the first terminal has display functions, the first switch passes signals for displaying the area information to the first terminal when the first terminal does have display functions, the first switch passes signals for audio-outputting the area information to the first terminal when the first terminal does not have display functions.

10. A mobile communications system comprising:
a first switch;
a first terminal accommodated in the first switch;
a second switch;
a plurality of base stations accommodated in the second switch; and
a second terminal that is a mobile terminal present inside an area controlled by one base station of the plurality of base stations;
wherein the second switch acquires information on the area occupied by the second terminal, from a response of the second terminal to a call based on a call establishment request to the second terminal from the first terminal, and sends the area information to the first switch, and the first switch passes the area information to the first terminal during call setup processing;
wherein the second switch puts the call setup processing on standby for a prescribed time period following the sending of the area information;
and wherein the first switch sends a call release instruction to the second switch when a call disconnect request is received from the first terminal, the second switch restarts call setup processing when no call release instruction is received within the prescribed time period, and the second switch executes call release processing when a call release instruction is received.

11. A mobile communications system comprising:
a first switch;
a first terminal accommodated in the first switch;
a second switch;
a plurality of base stations accommodated in the second switch; and
a second terminal that is a mobile terminal present inside an area controlled by one base station of the plurality of base stations;
wherein the second switch acquires information on the area occupied by the second terminal, from a response of the second terminal to a call based on a call establishment request to the second terminal from the first terminal, and sends the area information to the first switch, and the first switch passes the area information to the first terminal during call setup processing;
wherein the second switch puts the call setup processing on standby for a prescribed time period following the sending of the area information;
and wherein the first switch sends a call setup processing continuation instruction to the second switch when a call setting processing continuation request is received from the first terminal, the second switch restarts call setup processing when a call setup processing continuation instruction is received from the first switch within the prescribed time period, and the second switch executes call release processing when no call setup processing continuation instruction is received.

12. A mobile communications system comprising:
a first switch;
a first terminal accommodated in the first switch;
a second switch;
a plurality of base stations accommodated in the second switch; and
a second terminal that is a mobile terminal present inside an area controlled by one base station of the plurality of base stations;
wherein the second switch acquires information on the area occupied by the second terminal, from a response of the second terminal to a call based on a call establishment request to the second terminal from the first terminal, and sends the area information to the first switch, and the first switch passes the area information to the first terminal during call setup processing;
wherein the second switch puts call setup processing on standby until a call setup processing continuation instruction is received from the first switch after sending the area information;
and wherein the first switch sends a call setup processing continuation instruction to the second switch when no call disconnect request is received from the first terminal, the first switch sends a call release instruction to the second switch when a call disconnect request is received, the second switch restarts call setup processing when a call setup processing continuation instruction is received from the first switch, and the second switch executes call release processing when a call release instruction is received from the first switch.

13. A mobile communications system comprising:
a first switch;
a first terminal accommodated in the first switch;
a second switch;
a plurality of base stations accommodated in the second switch; and
a second terminal that is a mobile terminal present inside an area controlled by one base station of the plurality of base stations;
wherein the second switch acquires information on the area occupied by the second terminal, from a response of the second terminal to a call based on a call establishment request to the second terminal from the first terminal, and sends the area information to the first switch, and the first switch passes the area information to the first terminal during call setup processing;
wherein the second switch puts call setup processing on standby until a call setup processing continuation instruction is received from the first switch after sending the area information;
and wherein the first switch sends a call setup processing continuation instruction to the second switch when a call setup processing continuation request is received from the first terminal, the first switch sends a call release instruction to the second switch when no call setup processing continuation request is received, the second switch restarts call setup processing when a call setup processing continuation instruction is received from the first switch, and the second switch executes call release processing when a call release instruction is received from the first switch.

14. A method for communicating between a first terminal accommodated in a first switch and a second terminal that is a mobile terminal present inside an area controlled by one of a plurality of base stations accommodated in a second switch, comprising the steps of:

acquiring information on the area occupied by the second terminal from the response of the second terminal to a call from the second switch based on a call setup request to the second terminal from the first terminal;

sending the area information from the second switch to the first switch; and passing the area information from the first switch to the first terminal during call setup processing;

wherein the first switch determines whether or not the first terminal has display functions, the first switch passes signals for displaying the area information to the first terminal when the first terminal does have display functions, the first switch passes signals for audio outputting the area information to the first terminal when the first terminal does not have display functions.

15. A method for communicating between a first terminal accommodated in a first switch and a second terminal that is a mobile terminal present inside an area controlled by one of a plurality of base stations accommodated in a second switch, comprising the steps of:

acquiring information on the area occupied by the second terminal from the response of the second terminal to a call from the second switch based on a call setup request to the second terminal from the first terminal;

sending the area information from the second switch to the first switch; and passing the area information from the first switch to the first terminal during call setup processing;

wherein the second switch puts the call setup processing on standby for a prescribed time period following the sending of the area information;

and wherein the first switch sends a call release instruction to the second switch when a call disconnect request is received from the first terminal, the second switch restarts call setup processing when no call release instruction is received within the prescribed time period, and the second switch executes call release processing when a call release instruction is received.

16. A method for communicating between a first terminal accommodated in a first switch and a second terminal that is a mobile terminal present inside an area controlled by one of a plurality of base stations accommodated in a second switch, comprising the steps of:

acquiring information on the area occupied by the second terminal from the response of the second terminal to a call from the second switch based on a call setup request to the second terminal from the first terminal;

sending the area information from the second switch to the first switch; and passing the area information from the first switch to the first terminal during call setup processing;

wherein the second switch puts the call setup processing on standby for a prescribed time period following the sending of the area information;

and wherein the first switch sends a call setup processing continuation instruction to the second switch when a call setting processing continuation request is received from the first terminal, the second switch restarts call setup processing when a call setup processing continuation instruction is received from the first switch within the prescribed time period, and the second switch executes call release processing when no call setup processing continuation instruction is received.

17. A method for communicating between a first terminal accommodated in a first switch and a second terminal that is a mobile terminal present inside an area controlled by one of a plurality of base stations accommodated in a second switch, comprising the steps of:

acquiring information on the area occupied by the second terminal from the response of the second terminal to a call from the second switch based on a call setup request to the second terminal from the first terminal;

sending the area information from the second switch to the first switch; and passing the area information from the first switch to the first terminal during call setup processing;

wherein the second switch puts call setup processing on standby until a call setup processing continuation instruction is received from the first switch after sending the area information;

and wherein the first switch sends a call setup processing continuation instruction to the second switch when no call disconnect request is received from the first terminal, the first switch sends a call release instruction to the second switch when a call disconnect request is received, the second switch restarts call setup processing when a call setup processing continuation instruction is received from the first switch, and the second switch executes call release processing when a call release instruction is received from the first switch.

18. A method for communicating between a first terminal accommodated in a first switch and a second terminal that is a mobile terminal present inside an area controlled by one of a plurality of base stations accommodated in a second switch, comprising the steps of:

acquiring information on the area occupied by the second terminal from the response of the second terminal to a call from the second switch based on a call setup request to the second terminal from the first terminal;

sending the area information from the second switch to the first switch; and passing the area information from the first switch to the first terminal during call setup processing;

wherein the second switch puts call setup processing on standby until a call setup processing continuation instruction is received from the first switch after sending the area information;

and wherein the first switch sends a call setup processing continuation instruction to the second switch when a call setup processing continuation request is received from the first terminal, the first switch sends a call release instruction to the second switch when no call setup processing continuation request is received, the second switch restarts call setup processing when a call setup processing continuation instruction is received from the first switch, and the second switch executes call release processing when a call release instruction is received from the first switch.

* * * * *